United States Patent [19]

Aldred

[11] Patent Number: 4,747,689
[45] Date of Patent: May 31, 1988

[54] OPTICAL MEASUREMENT APPARATUS

[75] Inventor: Philip J. E. Aldred, Shrewsbury, England

[73] Assignee: Tesa Metrology Limited, Telford, England

[21] Appl. No.: 906,812

[22] Filed: Sep. 12, 1986

[30] Foreign Application Priority Data

Sep. 13, 1985 [GB] United Kingdom ............... 8522750

[51] Int. Cl.⁴ .............................................. G01B 11/04
[52] U.S. Cl. .................................... 356/385; 356/243; 358/199
[58] Field of Search ............... 356/384, 385, 386, 387, 356/392, 394; 250/224; 358/101, 107, 199, 108; 250/243

[56] References Cited

U.S. PATENT DOCUMENTS 4,390,278  6/1983  Inoue ............................. 356/394 X
4,498,778  2/1985  White ............................. 358/107 X

FOREIGN PATENT DOCUMENTS

2136954  9/1984  United Kingdom ............... 358/107

Primary Examiner—Eugene R. LaRoche
Assistant Examiner—Seung Ham
Attorney, Agent, or Firm—Jeffers, Hoffman & Niewyk

[57] ABSTRACT

An optical measurement apparatus for determining a plurality of dimensions of an object at linearly spaced locations on the object, in which the object is moved through a measurement station for measurement of a linear dimension of the object, to present the locations to be measured one by one. A light source on one side of the measurement station directs a beam of light at the location of the object in the measuring station transversely to the required line of measurement and to the path of movement of the object through the station. An elongate photo-electric array is disposed on the opposite side of the measurement station to the light source. A lens system focuses an image of the part of the object to be measured on the photo-electric array to form an image thereon. An elongate measurement graticule is provided on which a scale is delineated. Collimated light is directed through the graticule and thence into the lens system to be focused on to the photo-electric array whether or not an object is present in the apparatus for calibration of the array prior to or during a cycle of measurement of an object.

8 Claims, 10 Drawing Sheets

OPTICAL MEASUREMENT APPARATUS

BACKGROUND OF THE INVENTION

1. Field of the Invention

This invention relates to optical measurement apparatus for dimensional measurement of a wide range of components. It offers the advantages of non-contact measurement together with flexibility since the measurements and the measuring sequence are defined in software rather than hardware.

2. Description of the Prior Art

U.K. Patent Specification No. 2058344 discloses an electro-optical apparatus for inspecting an elongate workpiece such as a camshaft having spaced lobes which is supported and turned between centres. A sensor head is provided comprising a light source, a lens for forming an image of an edge of a camshaft lobe on a photo-diode array and a read out unit. No provision is made for re-calibration of the apparatus in the course of a sequence of measurement operations on a component.

U.K. Patent application No. 2078945 also discloses an optical measurement system in which photo-detectors are used. The apparatus is particularly concerned with the methods of analysing the light pattern produced on a photo-detector array and no provision is made for re-calibration during a measurement operation.

European Patent Specification No. 0 029 748 discloses a further electro-optical measurement system for measurement of widths and possibly the thickness of a strip being rolled. Two opto-electrical transducers are arranged above the strip and each is capable of viewing substantially the entire width of the strip. A processing unit is connected to the electrical outputs of the transducers to determine the position in space of the upper edges of the two sides of the strip. Again provision is made for re-calibration when the apparatus is in use.

SUMMARY OF THE INVENTION

This invention provides optical measurement apparatus for determining a plurality of dimensions of an object at linearly spaced locations on the object, comprising a measurement station for measurement of a linear dimension of the object, means to move the object through the measurement station to present the locations to be measured one by one, a light source on one side of the measurement station to direct a beam of light at the location of the object in the measuring station transversely to the required line of measurement and to the path of movement of the object through the station, elongate photo-electric array means disposed on the opposite side of the measurement station to the light source, lens means to focus an image of the part of the object to be measured on the photo-electric array means to form an image thereon of said part of the object and means to determine the dimension of the object from the image received on the array means, wherein an elongate measurement graticule is provided on which a scale is delineated, means are provided for directing collimated light through the graticule and thence into the lens system to be focussed on to the photo-electric array means whether or not an object is present in the apparatus for calibration of the array means prior to or during a cycle of measurement of an object.

Preferably means are provided to receive both light from the graticule and light having passed through the measurement station to direct light from both sources into the lens system and thence to the photo-electric array means.

In one specific arrangement the lens system may comprise two lenses mounted with their optical paths extending transversely to each other, two elongate photoelectric array means are provided to receive light from the lenses and means are provided at the where the light paths of the lens system intersect for opportioning light from the object being illuminated into both lens systems.

In any of the above arrangements the graticule may have a scale of markings the separation of which between each pair of markings is unique to that pair to facilitate identification of an image of a pair directed onto the array in a calibration operation.

More specifically the graticule may have a first scale having markings spaced at a first separation and a second scale interleaved with the first scale with markings set at a shorter separation to provide pairs of markings from the respective scales with individual separations for each pair for calibration of the apparatus.

Also in any of the above arrangements the graticule may also have a reference line extending lengthwise thereof for alignment/calibration purposes.

Furthermore a reference straight edge may be mounted adjacent to one side of the object to be measured to move with the object through the measurement station whereby concentricity, cylindricity or straightness of the object can be determined.

The invention also provides optical measurement apparatus for determining a plurality of dimensions of an object at linearly spaced locations on the object, comprising a measurement station for measurement of a linear dimension of the object, means to move the object through the measurement station to present the locations to be measured one by one, a light source on one side of the measurement station to direct a beam of light at the location of the object in the measuring station transversely to the required line of measurement and to the path of movement of the object through the station, photo-electric array means disposed on the opposite side of the measurement station to the light source, lens means to focus an image of the part of the object to be measured on the photo-electric array means to form an image thereon of said part of the object and means to determine the dimension of the object from the image received on the array means, wherein a display screen is provided and means are provided for converting the signals from the photo-electric array means into picture elements on the screen whereby repeated measurements along an object can be used to create an image of the object on the screen.

DESCRIPTION OF THE PREFERRED EMBODIMENTS

The following description relates to optical measurement apparatus including a computer programmed to control measurement of dimensions of elongate shaft-like components including diameters, ovalities, lengths between shoulders, concentricities, straightness and thread features utilising optical projection apparatus. The computer has a visual display unit on which an image of an object being measured may be created indicating the measurements thereof and other analysis of the measurements. A printer/plotter may also be provided for printing/plotting the results of the measurements.

In the description "light" includes both visible and infra-red radiation. Each light sensitive detector comprises a number of light sensors together with electronic circuits for control of the sensors and to read out the signals from the sensors, all of these parts formed as one integrated circuit connected to the computer. Such devices, in the form of photodiode arrays or ccd arrays are well known and are commercially available.

Generally the component under measurement is traversed through the measurement plane and measurements are taken at a number of positions along the component as each passes through the measurement plane. Thus readings from the light sensitive detectors are compared to a readings from the detectors when a setting piece of known size is in the measurement plane and hence the diameter (for a shaft-like component) or height (for other components) can be measured. The light sensitive detectors are connected to processing electronics connected to a computer system which calculates corresponding measurement from the signals received and is also used to control operation of the measurement apparatus. The axial position along the component at which the measurement has been taken is determined either by use of a long-range transducer on the linear traverse stage or by counting the number of steps moved by the stepper motor (under control of the computer system) which controls axial position or by use of a shaft encoder mounted on the screw of the leadscrew or ball screw mechanism.

Figure 1:
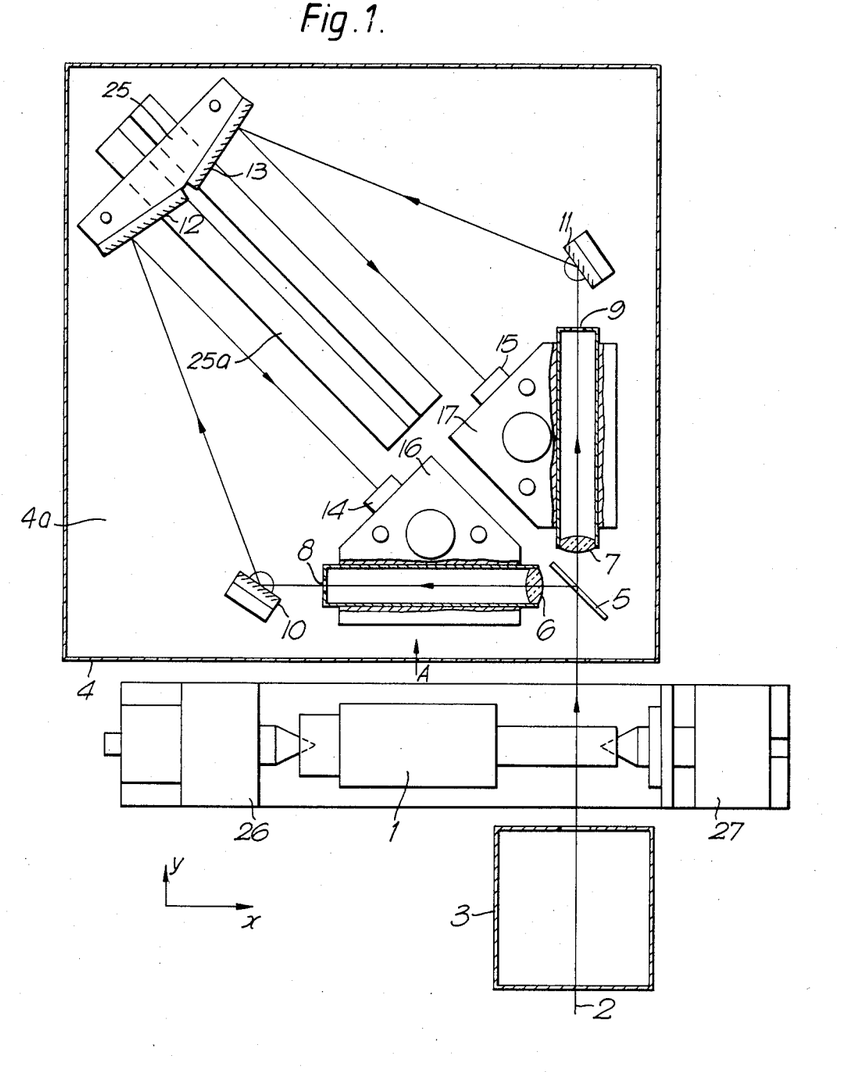
FIG. 1 is a plan view of a measurement apparatus in accordance with the invention.

With reference to the plan view, FIG. 1, the component 1 is mounted in a fixture and is traversed along the "x" axis through a measuring plane 2. The part of the component in and near the measuring plane is illuminated by source 3 comprising a lamp and collimating lenses. Light which passes the component enters a housing 4 which contains the image forming optics and light sensitive detectors mounted on a base 4a in the housing. A beam splitter 5 reflects half of the light towards lens 6 and transmits the other half towards lens 7. Telecentric stops 8, 9 positioned behind these lenses ensure that only light parallel to, or nearly parallel to, the optical axes of the lenses reaches the light sensitive detectors. This arrangement ensures firstly that the optical magnification is independent of variations in object position along the "y" direction and also that light reflected from the component surface, which would otherwise cause measurement errors, is excluded.

Mirrors 10, 12 and 11, 13 are used to fold the optical paths to two light sensitive detectors 14, 15 which lie in the image planes of lenses 6, 7. This arrangement reduces the overall size of the system for high resolution (hence high magnification and long optical paths) applications but, more importantly, it also allows the arrays to be mounted on the same supports 16, 17 as the lenses.

The measuring envelope of the system (i.e. the range of component diameters that can be measured) is considerably larger than the measuring range for each detector. For example, if each detector has 2000 sensing elements and the system resolution is 2 microns then the measuring range of each detector is 4 mm implying a diameter measuring range of 8 mm. By adjusting the positions of each lens/detector assembly by a mechanism to be described below with reference to FIG. 2, the measuring range becomes any 8 mm within a maximum determined by the height of mirrors 10, 11, 12, 13 and by the size of the field of illumination. Typically a 50 mm range can be used and where necessary this can be extended.

Figure 2:
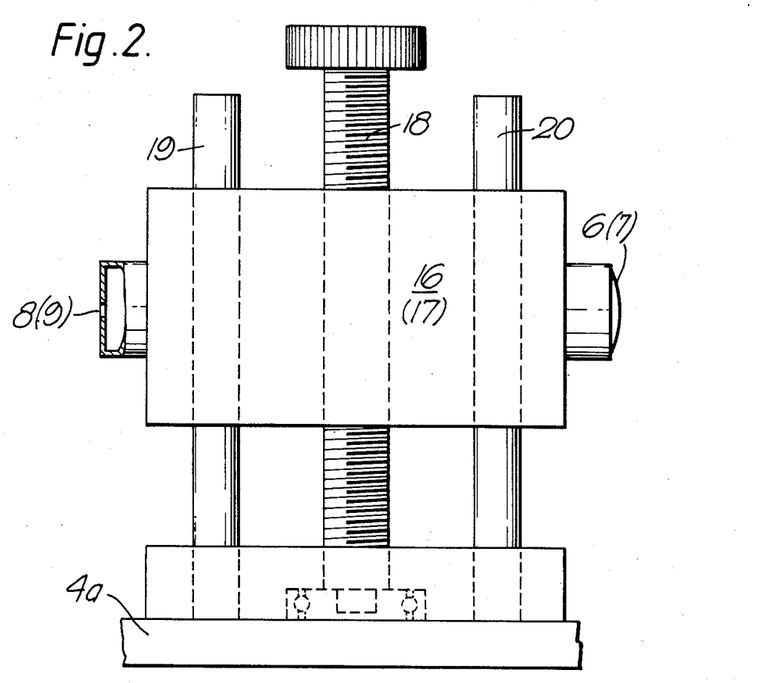
FIG. 2 is a detailed view looking in the direction of arrow A on part of FIG. 1.

With reference to FIG. 2, the mounting block 16 17 each has a vertical bore, part at least of which is threaded. Vertical screw 18 mounted on base 4a at its lower end has a knob at its upper end and a matching thread to engage in the threaded bore. Rotation of this screw causes the mounting block to be raised or lowered. Fixed guide rods 19, 20 prevent lateral movement of the block 16,17.

Adjustment of the lens and detector simultaneously as described above ensures that the detector is always on the optical axis of the lens and that the aperture of the lens is kept small, both of which lead to higher accuracy than the alternative arrangement in which a large aperture lens is used and only the detectors are moved. Furthermore, the close proximity of lens and sensor reduces the effects of any thermally induced distortions in the system.

Mirrors 10, 11 are each mounted via a support 21 (FIG. 3) which rotates about a peg 22 for coarse angular adjustment of the mirror. Fine adjustment is achieved through a flexure pivot 23 and clamping screw 24 incorporated in 21. These fine adjustments are used to ensure that the two detectors view opposite points on the component.

Figure 4:
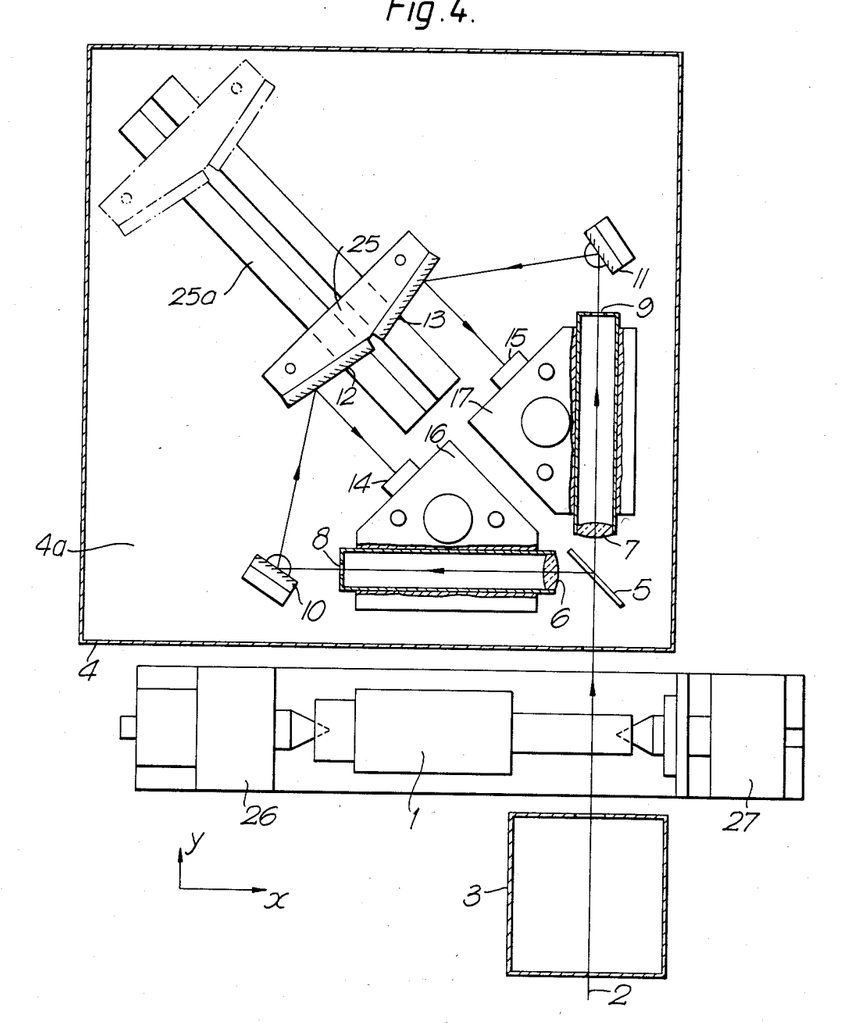
FIG. 4 is a similar view to that of FIG. 1 showing the apparatus in a different position of adjustment.

Mirrors 12, 13 share a common mount 25 which can be transversed in a slideway on the base 4a as shown in FIG. 4 towards the arrays 14, 15 to increase the resolution and hence the measuring range by reducing the optical magnification. Lenses 6, 7 are also adjusted for correct focus at the new magnification.

The axial position of the component is altered by a motor/leadscrew or motor/ballscrew or other linear traverse arrangement and this axial position is monitored either by using a stepper motor and counting the number of steps or by a shaft encoder on the screw or, for maximum precision, by using a long-range linear transducer.

Figures 5, 6:
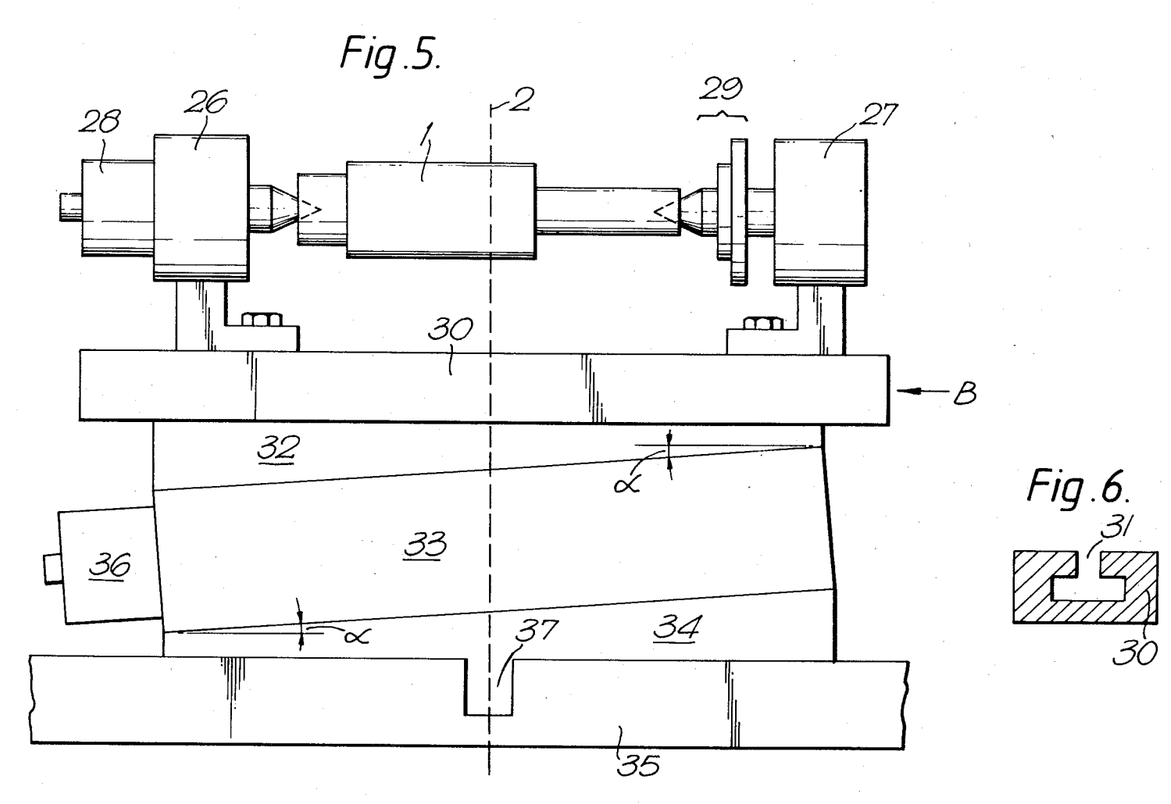
FIG. 5 is a side elevation view of the apparatus shown in FIG. 1.
FIG. 6 is a detailed view of part of the apparatus shown in FIG. 5 looking in the direction of arrow B.

An elevation of the component mounting fixture is shown in FIG. 5. The component 1 is mounted between centres 26, 27 one of which, 26 can be driven by a motor 28, preferably a stepper motor, to rotate the component for some measurements (e.g. ovality). The other centre, 27 is spring loaded (details not shown) to hold the component firmly and also incorporates a calibrated setting piece 29 in the form of a stepped cone which is used to calibrate the gauge and can also be used to check the calibration during each measurement cycle. Both centres can be adjusted in position along a track 30 to suit the length of the component andd are clamped using a T-slot 31 in the track 30. Alternative methods for holding the component, such as vee supports can also be used.

The track 30 is connected to the gauge base 35 via two wedges 32, 34 and a linear traverse unit 33. The linear traverse is typically a ball screw or leadscrew driven by a stepper motor 36.

The purpose of the wedges 32, 34 is to raise the component as it travels through the measurement plane 2 while maintaining the component axis in the horizontal plane. The wedges may be simple wedges as shown in FIG. 5 or adjustable using a pivot and spacers or a sine table arrangement.

With these wedges, and assuming an ideal response from the light detector, the resolution of the system is improved by a factor "N" if "N" readings over an axial distance along the component of "x" are averaged where $$x = \frac{nr}{\tan\alpha}$$

in which "r" is the nominal resolution of the system (i.e. the detector array resolution divided by the optical magnification), "n" is an integer and "α" is the angle of the wedges 32, 34.

This improvement is more effective than the improvement gained by simple averaging of multiple readings since it is proportional to N whereas the latter is proportional to $\sqrt{N}$. The latter method also assumes that some source of random variations of magnitude at least comparable to "r" is also present and this is not necessarily valid.

For typical values of
r=5 micron
x=0.5 mm
n=1
we have
α=0.01 rad

There is a loss of useful measuring range due to the movement of the component in the vertical plane as it is traversed horizontally. This loss is X tan α where X is the total horizontal traverse. Thus with this system we have $$\text{resolution} = \frac{r}{N}$$
$$\text{range} = rNs - X\tan\alpha$$
$$= r\left(Ns - \frac{X}{x}\right)$$

where
Ns=number of sensors in the detector
n=1

Thus for typical values of Ns=2000 X=200 mm. x=0.5 mm N=10 there is a ten fold improvement in resolution gained for a 20% loss of measuring range. This is equivalent to an 8 fold improvement in resolution for a given measuring range.

A value of N=10 is the useful practical maximum with currently available arrays since variations from the ideal in array output (e.g. differences in sensitivity between diodes, noise) will limit any further improvement.

The final element of the fixture is a pivot 37 in the measuring plane about which the fixture may be rotated to align the component correctly for measurement of thread features.

Figure 10:
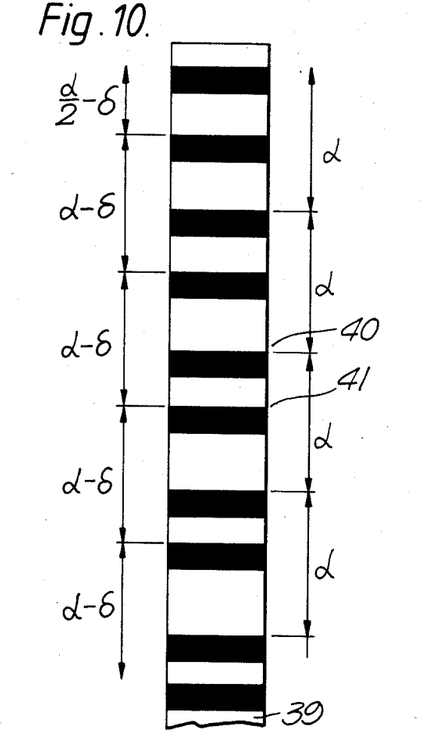

In the above apparatus calibration of the gauge involved a setting piece 29 of known size mounted on the fixture. This is a considerable simplification compared to the requirement when gauging with contact probes for a calibrated master component as a setting piece, but in accordance with the present invention the method can be improved further by incorporating the setting piece in the optical system itself as shown in the plan view FIG. 7. In addition to the components 1-17 described previously there is a second source of collimated light 38, a graticule 39 and a mirror 40. The graticule 39 has the form shown in FIG. 10 and comprises a series of transparent and opaque bands. One edge of each opaque band, for example the upper edges in FIG. 10 is a reference edge and the opaque bands form two sets. One set is spaced with a separation d and the other set which alternates with the first has a spacing d-δ where δ is small compared to d and is shown somewhat exaggerated in FIG. 10. There is an initial offset of d-δ/2 between the two sets. The effect of this arrangement is that the separation between any two consecutive reference edges, for example 40, 41 is unique and other arrangements of the bands which ensure that all the spacings are different could also be used. The value for d is set such that:

d<measuring range of one detector

Thus there are always at least two reference edges in the field of view of each detector and by sensing the position and separation of these edges for both detectors the gauge may be calibrated. The number N of edges is such that $$\frac{Nd}{2} > \text{maximum measurable component size}$$

In practice to achieve high accuracy the graticule is calibrated before use to correct for variations in actual edge positions from the ideal positions shown in FIG. 10, the calibrated values being stored in the computer which forms part of the measurement system.

Figure 7:
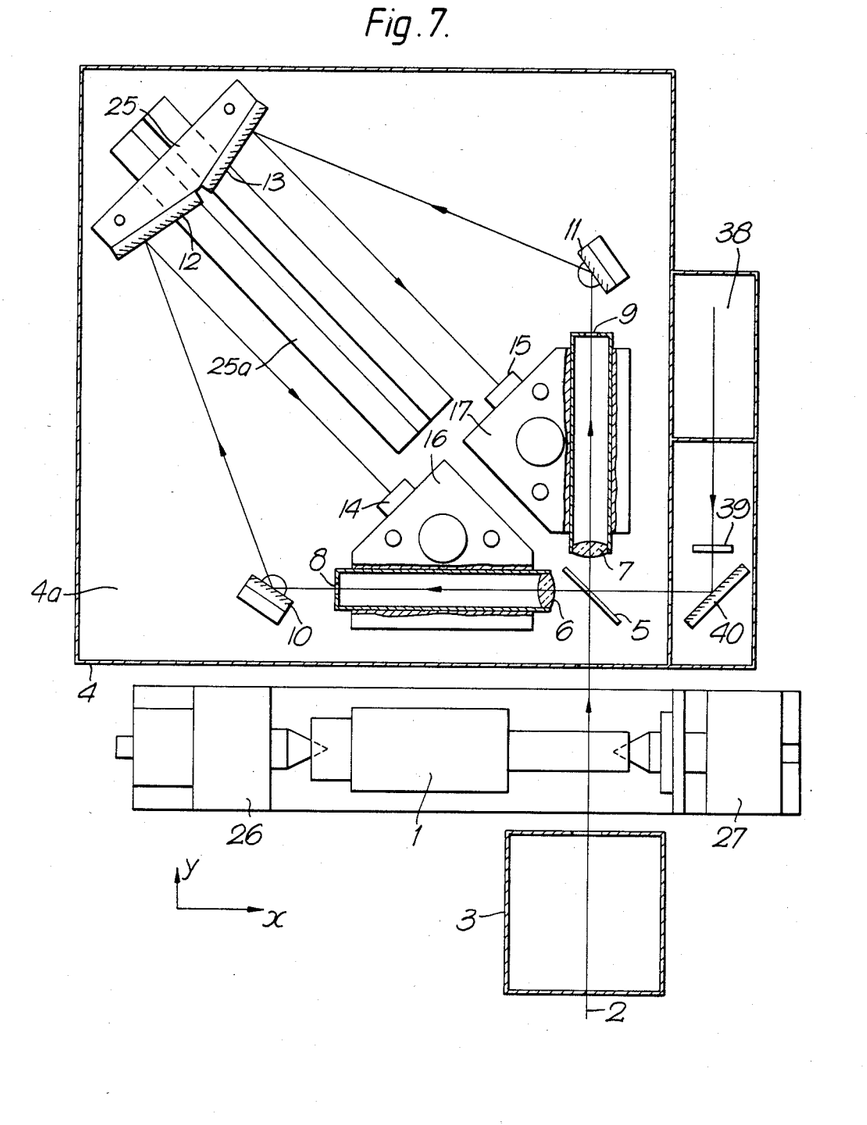
FIGS. 7 to 10 illustrate a number of modifications to the above described apparatus.

To calibrate the system, illumination source 3 is switched off and source 38 is turned on. The beam splitter 5 will transmit half of the light to lens 6 and reflect half to lens 7. The optical path length from graticule 39 to beam splitter 5 is the same as that from the centreline of component 1 to beam splitter 5 and therefore the graticule image is correctly focussed. Movements of the graticule caused, for example, by thermally induced distortions will not affect the accuracy of calibration. Switching of the illumination sources may be via control of the power supplies to the lamps or by means of shutters for higher speed.

Alternatively, if the source 38 is arranged to be brighter than the source 3 then 3 need not be switched off at all since automatic gain control on the light detector output will ensure that only reference edges on the graticule are detected by the signal processing electronics.

This method of calibration offers the advantages of protecting the setting piece within an enclosure and of reducing measurement cycle times since the previously described method requires extra axial traverse distance to bring the setting piece into the measurement plane.

Another important feature is that calibration can be effected at any time during the measurement cycle. This permits in-cycle adjustment of the two lens/detector assemblies, for example by motorising the screw adjustment previously described and subsequent recalibration thereby extending the measuring capability of the system. This will facilitate measurement at high resolution of components with large diameter ranges. If the motors are servo controlled a contour can also be followed using the light detectors as null detectors and using a separate transducer to measure the positions of the lens/detector assemblies.

Figure 8:
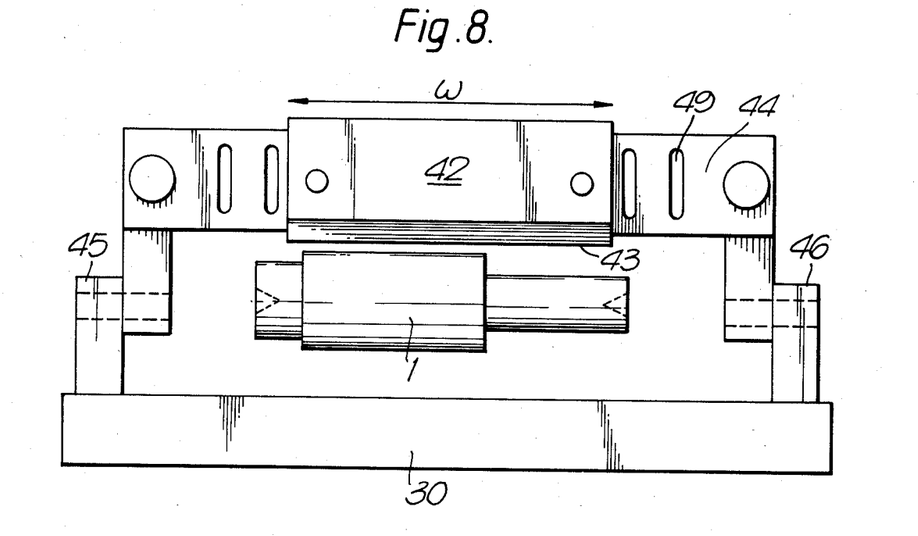
Figure 9:
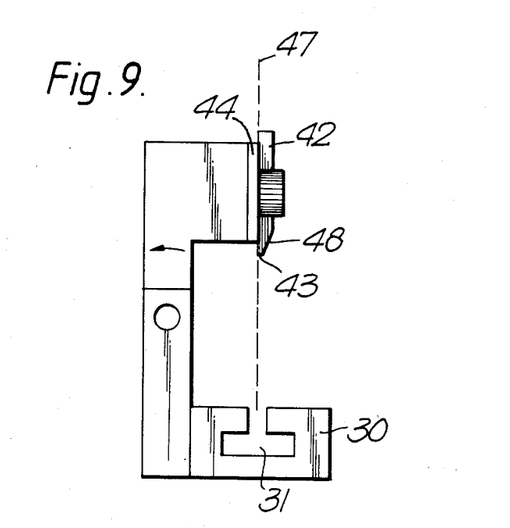

The third enhancement to the previously described system is the provision on the mounting fixture of a reference straight edge for high accuracy measurement of component features such as cylindricity, concentricity or straightness even in the presence of errors in straightness of the axial traverse mechanism. In fact the accuracy requirement on the carriage can be reduced. FIG. 8 shows a component 1 in relation to the mounting track 30 previously described. The component supports 26, 27 have been omitted for clarity. A plate 42 with a reference straight edge 43 is mounted on a carrier 44 which is itself mounted on the track by two pivoting supports 45, 46. The purpose of the pivots is to allow the plates 42, 44 to be rotated in the direction shown during insertion and removal of components in order to make these tasks easier. The pivots are arranged such that the plate 42 is in the focal plane 47 of the image forming lens and therefore above the T slot 31 in the track. The plate 42 is chamfered 48 near the reference edge to minimize its thickness and therefore improve the quality of the optical image while retaining a thicker and therefore stronger plate generally.

The carrier 44 incorporates a number of slots 49 which allow the plate 42 to be conveniently located clear of but near to the component and which also allows other plates similar to 42 but of different widths w to be used to suit the component length.

There is no requirement, for these measurements, for the edge 43 to be accurately parallel to the component axis.

The final enhancement is an alternative method of use of the gauging system. By traversing a component continuously through the measurement plane and reading and storing all the array readings in the computer, a two dimensional image of the component can subsequently be created by computer graphics. This image is equivalent to that created in a standard optical projector but it has some important advantages. These include:

(A) any part of the image can be expanded on the graphics screen by software without adding any distortions since the "Magnification" is precise.

(B) high accuracy copies of the image can be created on a two dimensional plotter or printer.

(C) Dimensional information between any points on the image can be extracted since high resolution measurements are directly stored in the computer.

These features are of considerable value in improving the accuracy and ease of inspection of components whose geometry or small batch size currently make standard optical projection and visual inspection of the resulting image the preferred method of inspection.

Figure 11:
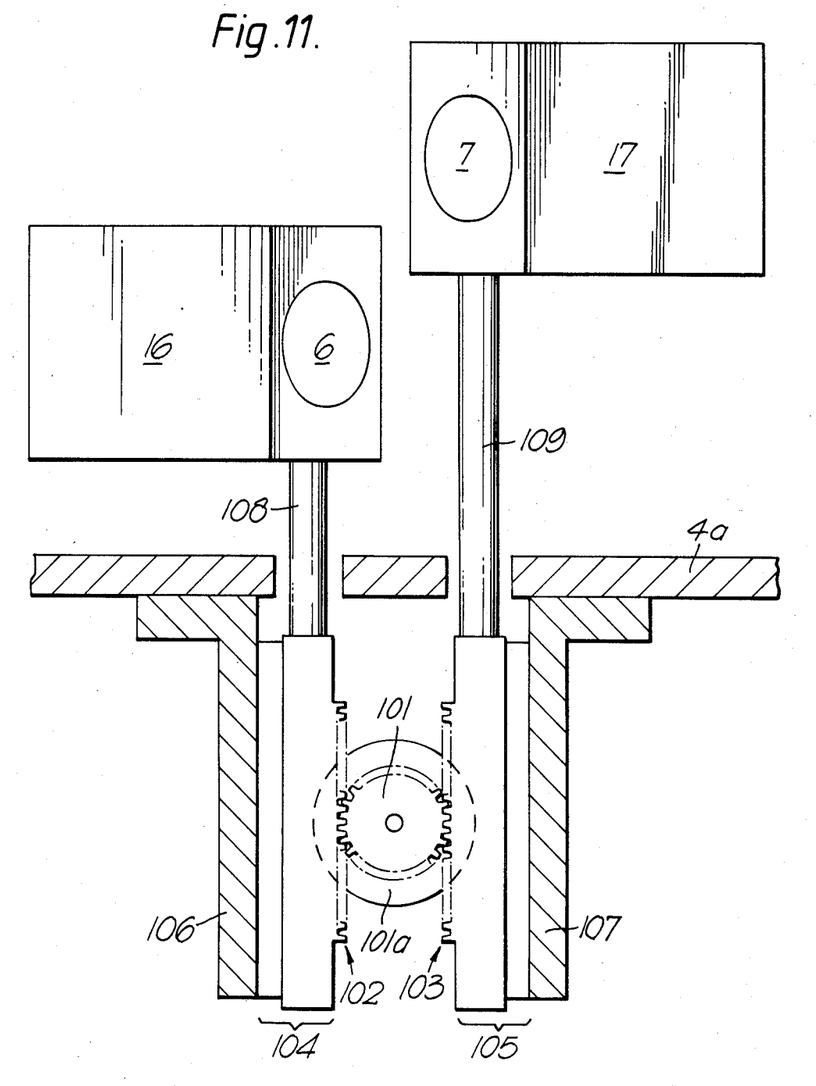
FIGS. 11 to 15, illustrate further modifications.

An alternative method for adjusting the vertical separation between the two lens mounted block 16,17 as shown in FIG. 11 and comprising a pinion 101 driven by a motor 101a and engaging two racks 102.103. The racks are mounted on vertical linear slides 104,105 which are themselves supported via brackets 106,107 to the underside of the baseplate 110 which supports the other elements of the optical system. The lens mounting blocks 16,17 are mounted above the racks via pillars 108.109. Rotation of the motor connected to the pinion causes one rack to rise and one to fall thus increasing or decreasing the vertical separation between the lens mounting blocks 16, 17. The motor is conveniently a stepper motor which has good holding torque at standstill and which can be interfaced using standard electronic drives to the gauge control computer.

Figure 3:
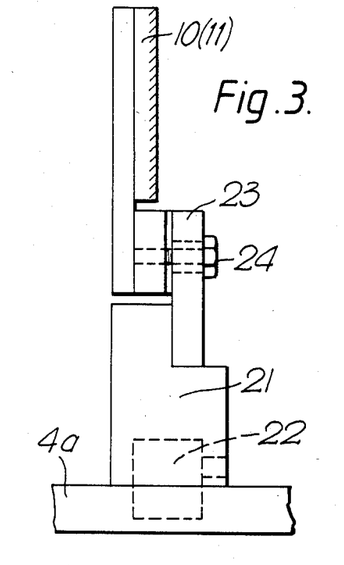
FIG. 3 is a side view of a component.
Figure 3A:
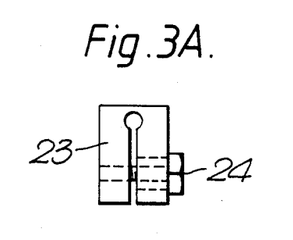

The beam splitter 5 can be replaced by a small mirror 120 mounted on an adjustable bracket attached to the lens mounting block 16 (see FIGS. 2, 3). This doubles the light intensity on the light sensitive arrays 14, 15 and therefore increases the speed of measurement since the arrays may be scanned electronically more quickly.

Figure 12:
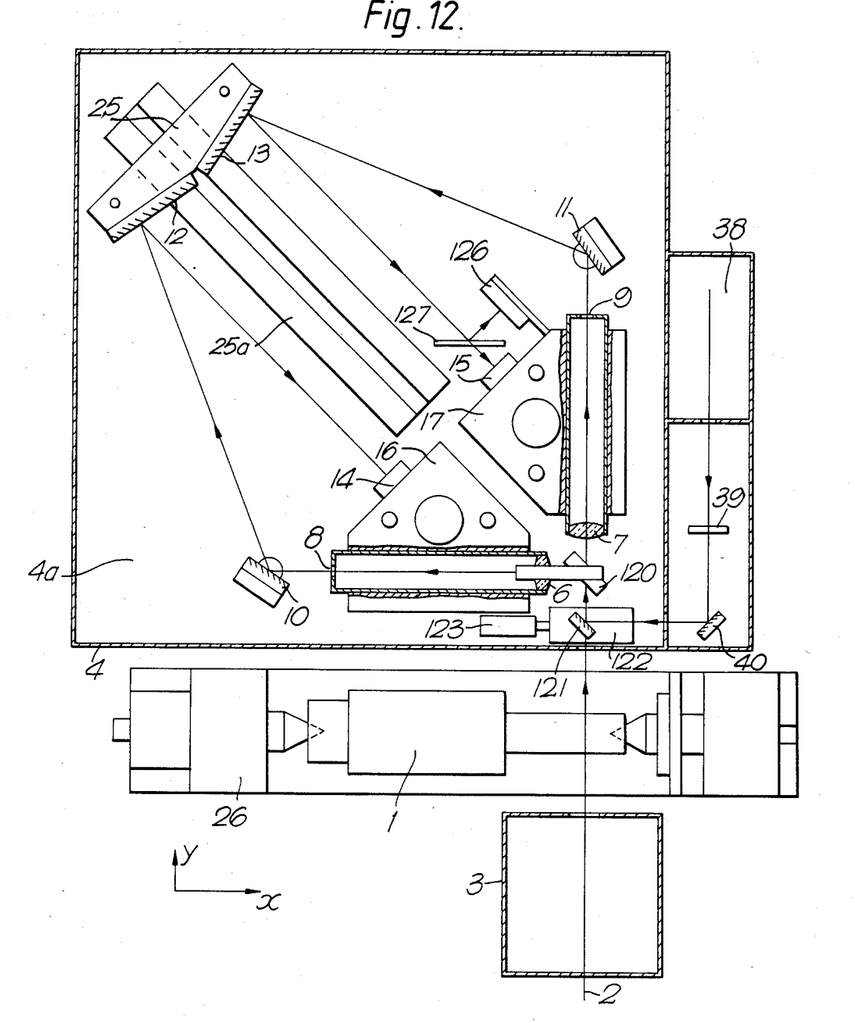
Figure 13:
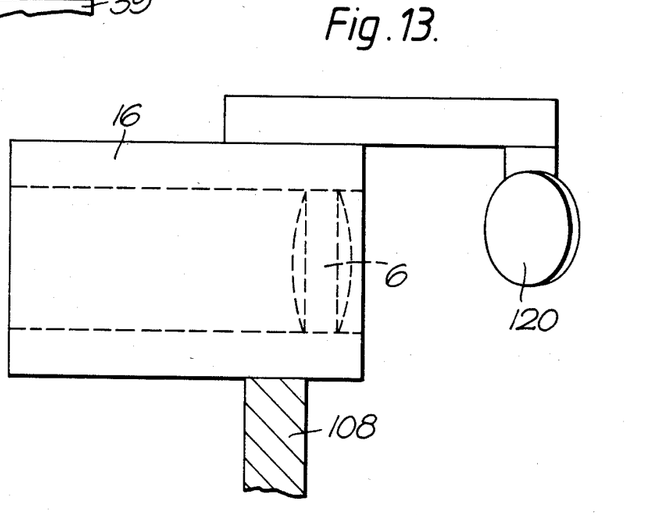

An alternative method for switching between measurement in which an image of part of the object under measurement is focussed onto the light sensitive arrays, and calibration, in which an image of part of the graticule 39 is focussed onto the light sensitive arrays, involves a "shuttle" mirror 121 mounted on a slide 122 and moved to either of two positions by an actuator 123 which can be an electric solenoid (see FIG. 12).

Figure 14A:
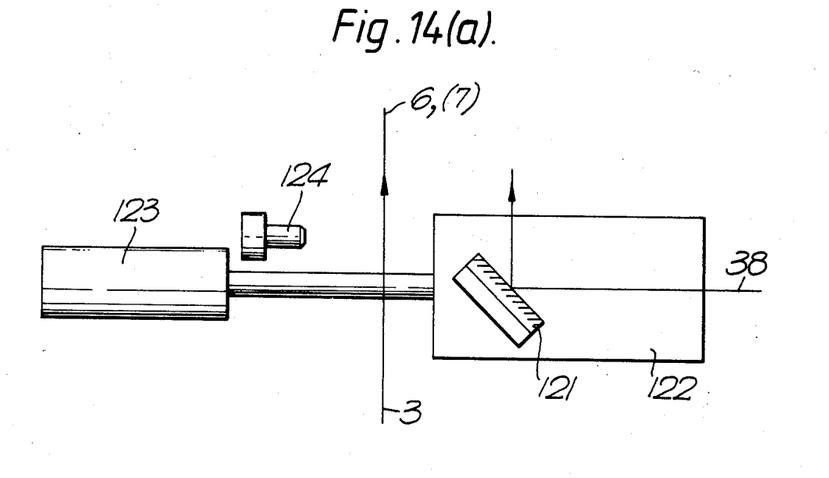

When the slide is moved to the right hand position (see FIG. 14(a)) then light from the lamp 3 used to illuminate the object under measurement can reach the lenses 6,7 and light sensitive arrays 14,15 as previously described.

Figure 14B:
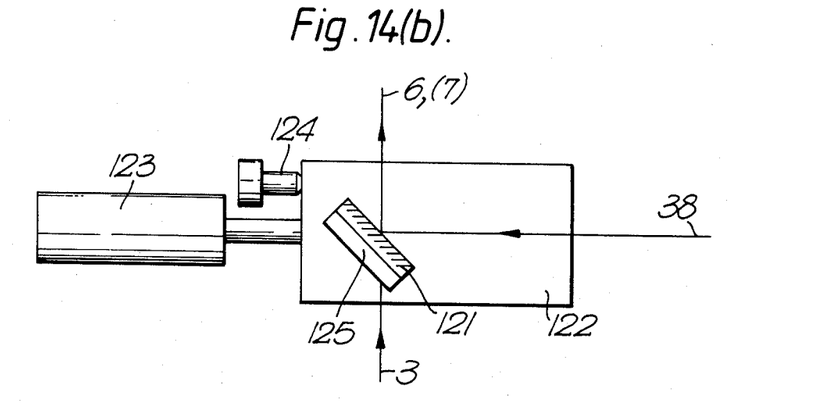

When the slide is moved to the left hand position, defined by and adjustable stop 124 see FIG. 14(b)) then the support 125 for the mirror 121 blocks the light from lamp 3 and the mirror reflects light from lamp 38 onto lenses 6,7. An image of part of the graticule 39 is then formed on the arrays 14, 15.

Both the shuttle mirror 121 or the alternative beam splitter 5 must be flat to a good standard to avoid introducing errors in diameter measurement. To achieve this with a beam splitter implies either the use of a thick glass beam splitter with consequent "ghost" images or the use of a "pellicle" or thin plastics membrane beam splitter which is relatively fragile.

The mirror 121, which only uses front surface reflection, avoids these problems but for highest speed, the previously described system using a beam splitter is to be preferred.

In order to reduce the time taken to find edges on the component under measurement for length measurements a third light sensitive array has been incorporated in the system as shown in FIG. 12.

This array 126 is mounted horizontally and is attached to mounting block 17 (see FIG. 2). A beamsplitter 127 reflects half the intensity of the light falling on it onto the horizontal array 126 and transmits half the intensity to the vertical array 15 used for diameter measurements. Both the beamsplitter 127 and array 126 are connected to the mounting block 17 and are therefore moved vertically when the block is moved. This enables the distance from the component centre at which the position of the edge is measured to be selected as required. For example in the case of a peripheral groove in a component, the faces of the groove can be measured at several distances from the component axis to determine any taper of the groove.

An extension to this is to mount another horizontal array and beamsplitter on the other lens mounting block 16 and this would further increase the speed of some measurements (such as parallelism of one fact to another or squareness of the face of the component axis) by reducing the need to rotate the component.

The speed gain achieved through use of the horizontal array arises from having a significant measuring range in the axial direction along the component. This means that the axial drive in the "X" direction need only locate the nominal position of an edge in the plane of measurement and the actual position is then determined by a single reading using the horizontal array. The previous method, using the vertical array to find a change in diameter, required a number of readings as the component was moved axially in small increments, a procedure which inevitably took more time.

Vertical movement of the arrays can introduce errors into length measurements unless the movement is accurately normal to the component axis. These errors can be eliminated by a modification to the graticule 39 shown in FIG. 15.

Figure 15:
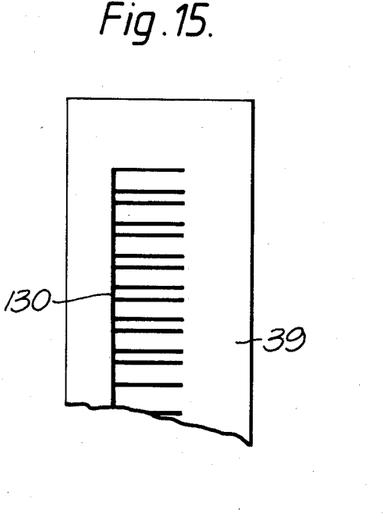

In addition to the sequence of opaque bands described previously and which are used to calibrate the gauge for diameter measurement, a single vertical line 130 has been added. One edge of this line (the left hand edge in FIG. 5) is known to be straight to sufficient accuracy or is calibrated. By measuring the position of the image of this vertical line on the horizontal array both before and after vertical movement of the arrays, any horizontal component of that movement can be measured and eliminated from length measurements.

This method also eliminates any errors that could be caused by the small variations in the position of the shuttle mirror each time it is moved to the left hand position (FIG. 14(b)), since it is only the change in the horizontal array reading, rather than the absolute values, which is used to make the correction.

I claim:

1. Optical measurement apparatus for determining a plurality of dimensions of an object at linearly spaced locations on the object, comprising a measurement station for measurement of a linear dimension of the object, means to move the object through the measurement station to present the locations to be measured one by one, a light source on one side of the measurement station to direct a beam of light at the location of the object in the measuring station transversely to the required line of measurement and to the path of movement of the object through the station, elongate photoelectric array means disposed on the opposite side of the measurement station to the light source, lens means to focus an image of the part of the object to be measured on the photo-electric array means to form an image thereon of said part of the object and means to determine the dimension of the object from the image received on the array means, wherein an elongate measurement graticule is provided on which a scale is delineated, means are provided for directing collimated light through the graticule and thence into the lens system to be focussed on to the photo-electric array means whether or not an object is present in the apparatus for calibration of the array means prior to or during a cycle of measurement of an object.

2. Optical meaurement apparatus as claimed in claim 1 wherein means are provided to receive both light from the graticule and light having passed through the measurement station to direct light from both sources into the lens system and thence to the photo-electric array means.

3. Optical measurement apparatus as claimed in claim 2 wherein the lens system comprises two lenses mounted with their optical paths extending transversely to each other, two elongate photoelectric array means are provided to receive light from the lenses and means are provided at the where the light paths of the lens system intersect for apportioning light from the object being illuminated into both lens systems.

4. Optical measurement apparatus as claimed in claim 1 wherein the graticule has a scale of markings the separation of which between each pair of markings is unique to that pair to facilitate identification of an image of a pair directed onto the array in a calibration operation.

5. Measurement apparatus as claimed in claim 4 wherein the graticule has a first scale having markings spaced at a first separation and a second scale interleaved with the first scale with markings set at a shorter separation to provide pairs of markings from the respective scales with individual separations for each pair for calibration of the apparatus.

6. Optical measurement apparatus as claimed in claim 1 wherein the graticule also has a reference line extending lengthwise thereof for alignment/calibration purposes.

7. Optical measurement apparatus as claimed in claim 1 wherein a reference straight edge is mounted adjacent to one side of the object to be measured to move with the object through the measurement station whereby concentricity, cylindricity or straightness of the object can be determined.

8. Optical measurement apparatus for determining a plurality of dimensions of an object at linearly spaced locations on the object, comprising a measurement station for measurement of a linear dimension of the object, means to move the object through the measurement station to present the locations to be measured one by one, a light source on one side of the measurement station to direct a beam of light at the location of the object in the measuring station transversely to the required line of measurement and to the path of movement of the object through the station, photo-electric array means disposed on the opposite side of the measurement station to the light source, lens means to focus an image of each part of the object to be measured on the photo-electric array means to form a succession of images thereon of said parts of the object and means to determine the dimension of each respective part of the object from the image received on the array means and to provide a series of signals corresponding to the received images, wherein a display screen is provided and means are provided for converting said signals from the photo-electric array means into picture elements and assembling said picture elements on the screen to create on the screen an image of the object derived from the measurements made on the screen representing the object.

* * * * *